United States Patent [19]
Kepper

[11] 3,946,213
[45] Mar. 23, 1976

[54] TAXIMETER

[75] Inventor: George John Kepper, Croydon, Australia

[73] Assignee: Haca Pty. Ltd., Doncaster, Australia

[22] Filed: Aug. 1, 1974

[21] Appl. No.: 493,550

[30] Foreign Application Priority Data
Aug. 10, 1973 Australia.............................. 4423/73

[52] U.S. Cl............. 235/151.32; 235/30 R; 235/45
[51] Int. Cl.².......................................... G07B 13/00
[58] Field of Search....... 235/150.53, 150.5, 151.32, 235/150.2, 30 R, 33, 45, 92 TC; 324/163, 164, 166

[56] References Cited
UNITED STATES PATENTS

| 3,388,859 | 6/1968 | Kelch et al....................... 235/30 R |
| 3,480,859 | 11/1969 | Fichter.............................. 324/163 |
| 3,512,706 | 5/1970 | Bruce-Sanders.................. 235/30 R |
| 3,703,985 | 11/1972 | Berg.................................. 235/30 R |
| 3,714,538 | 1/1973 | Albrecht et al................. 324/164 X |
| 3,725,668 | 4/1973 | Padgitt......................... 324/163 UX |
| 3,818,186 | 6/1974 | Harwood.......................... 235/30 R |

Primary Examiner—Joseph F. Ruggiero

[57] ABSTRACT

A taximeter in which taxi speed is represented by an analogue signal, the analogue signal controlling the frequency of a variable frequency oscillator and an indicated taxi fare read out being obtained by counting pulses from the oscillator to display a fare charge the rate of advancement of which is thus dependent upon the magnitude of the analogue signal.

4 Claims, 5 Drawing Figures

TAXIMETER

BACKGROUND OF THE INVENTION

1. Field of the Invention:

This invention relates to taximeters.

2. Description of Prior Art:

Mechanical taximeters generally employ two rotatable elements, one of which is driven by a motor at a constant rotational speed, and the other of which is driven usually indirectly, from the taxi wheels or gear box or speedometer cable at a rate which is proportional to the speed of the vehicle. Clutch means is provided operating to couple an output shaft to whichever of the two rotatable elements is rotating at the greater speed. This shaft drives a metering and display mechanism to display a fare charge corresponding to the number of rotations of the output shaft. The indicated fare will thus advance at a constant rate when the vehicle is stationary as the output shaft will be driven at a constant speed or "time" rate by the rotatable element which is coupled to a motor. On the other hand, when the vehicle is travelling at a speed greater than a predetermined speed, the fare is advanced at a rate proportional to the distance or "mileage" being travelled by the vehicle, the output shaft in this case being driven by that rotatable element which is coupled to the taxi wheels, gear box or speedometer cable.

Mechanical taximeters are somewhat disadvantageous in that they employ numerous parts which are prone to wear and require constant servicing. This difficulty has been sought to be overcome by providing electronic digital taximeters which replace the mechanical clutch, the rotatable elements and the motor for driving one of the elements by a fixed frequency oscillator, to represent the time rate, and a variable frequency generator, generating a signal the frequency of which is varied in proportion to the speed of the vehicle. These oscillators produce pulse streams, and suitable electronic selector means is provided to select whichever of the two pulse streams is at the highest frequency and apply this to advance a fare couter. Whilst these arrangements require virtually no moving parts, and are inherently quite reliable, they are still disadvantageous in that it is possible to lose a pulse from each pulse stream during transitions caused by switching of the selected pulse stream from the mileage pulse stream to the time pulse stream. Such lost pulses result in loss of revenue and the loss can be significant in cases where frequent mileage time transitions occur, such as in city driving. An object of the invention is to at least substantially avoid this difficulty.

BRIEF DESCRIPTION OF THE INVENTION

According to the invention there is provided a taximeter comprising generator means for generating a generator analogue signal representing the speed of a taxi with which the meter is to be used, and fare read-out means coupled to said generator means for displaying a fare charge which is advanced in dependence upon said analogue signal at a rate which, when the taxi meter is coupled to a taxi, is proportional to the speed of the taxi.

The fare read-out means may be arranged such that the displayed fare charge is not advanced in dependence upon said analogue signal when the condition of the analogue signal is such as to correspond to movement of a taxi to which the taxi meter is fitted at less than a predetermined speed. Alternatively, the fare read-out means may be arranged such that the displayed fare charge is not advanced in dependence upon said generator analogue signal when the generator analogue signal has not been in a condition indicative of motion of a taxi to which the meter is fitted for more than a predetermined time period.

In the first case, the fare read-out means preferably includes a reference source for generating a reference analogue signal representative of said predetermined speed of said vehicle and selector means coupled to receive and compare the analogue signals generated by said generator means and by said source to control the rate of fare advanced in dependence upon the reference analogue signal when the generator analogue signal is indicative of a lesser speed than said predetermined speed and in dependence upon the generator analogue signal when the speed represented thereby is greater than said predetermined speed. Preferably, too, in this case, the fare read-out means further comprises a taxi meter wherein said fare read-out means includes an oscillator coupled to receive the selected one of said analogue signals from said selector means and operates to generate an output signal having a frequency which is fixed when said reference analogue signal is passed thereto and which is at a frequency proportional to the speed indicated by the generator analogue signal when this is passed thereto, counter and display means also being provided in said fare read-out means and coupled to receive said output signal and operating to count individual pulses thereof and to display visually said fare in accordance with pulses so counted. In the second case, the fare read-out means preferably includes an oscillator coupled to receive said generator analogue signal via time delay circuit means which delays said generator analogue signal by said predetermined time period, said oscillator generating an output having a frequency which is fixed, when said analogue signal is indicative of zero taxi speed, and which is at a frequency proportional to taxi speed when the generator analogue signal is indicative of taxi speed above zero, counter and display means also being provided in said fare read-out means and coupled to receive said output signal and operating to count individual pulses thereof and displaying visually said fare in accordance with pulses so counted.

In either instance, the generator analogue signal is preferably a DC voltage directly proportional to the taxi speed, and the oscillator is a voltage controlled oscillator.

The invention also provides a taxi meter including a variable frequency oscillator, counter and display means for counting output pulses from the oscillator and displaying a fare charge in proportion to pulses counted, generator means for generating an analogue signal representing the speed of a taxi to which the meter can be fitted and control means controlling the frequency of said oscillator in accordance with said analogue signal, at least when said signal is above a predetermined level or has been above a predetermined level for a predetermined time.

BRIEF DESCRIPTION OF THE SEVERAL VIEWS OF THE ACCOMPANYING DRAWING

The invention is further described with reference to the accompanying drawings in which.

DETAILED DESCRIPTION

Figure 1:
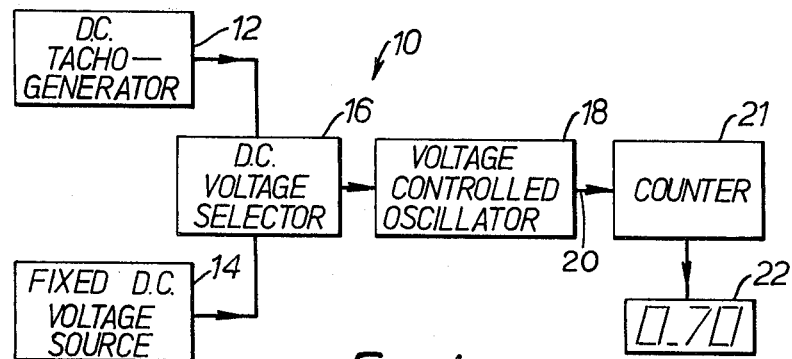
FIG. 1 is a block schematic diagram of one form of taxi meter constructed in accordance with the invention.

The taxi meter 10 shown in FIG. 1 includes a direct current tacho generator 12 having an input shaft coupled to, for example, the speedometer cable of the taxi or to the gear box or to the wheels thereof so that the shaft is driven at a rate proportional to the vehicle speed. The tacho generator provides a direct current output proportional to the speed of the vehicle. A fixed direct current voltage source 14 is also provided, the output of this representing time. The outputs from the tachometer 12 and source 14 are fed to a direct current voltage selector 16 which selects whichever of the two voltages generated by tacho generator 12 and source 14 is highest and passes this to a voltage controlled oscillator 14. The voltage controlled oscillator has a variable frequency output, the frequency being proportional to the output voltage from selector 16. Output pulses produced by the oscillator are fed to a counter 21 which operates to advance a fare readout display means 22 to display a fare which is advanced at a rate proportional to the pulse rate on line 20.

When the taxi to which the taxi meter 10 is attached is stationary, the tacho generator 12 produces zero output and voltage selector 16 thus provides, at its output, the voltage provided by source 14. Thus, when the taxi is stationary, the output frequency of oscillator 18 is constant and the fare displayed by the display means is advanced at a constant "time" rate. When the taxi accelerates from rest, the voltage provided by tacho generator 12 increases until, at a predetermined vehicle speed, it exceeds the voltage provided by source 14. In this case, then, the counter advances the displayed fare at a rate proportional to the speed of travel of the taxi.

Figure 2:
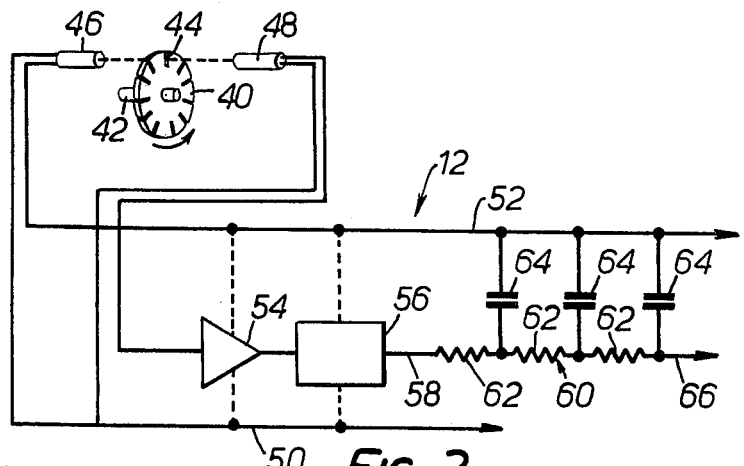
FIG. 2 is a diagram of the electrical circuit of a DC tacho generator incorporated into the taxi meter of FIG. 1.

Tacho generator 12 is shown in FIG. 2. It includes a disc 40 secured to an axle 42, which axle comprises the input shaft of the generator. Disc 40 has a plurality of radial slots 44 extending inwardly from its periphery and a light source 46 positioned to one side of the disc so that light can pass to the other side only when a slot 44 is positioned in the path of light from the source 46. Light source 46 comprises a light emitting diode which is coupled to electrical source 14 via a positive supply rail 52 and a ground line 50. A photocell 48 is positioned to the side of disc 40 remote from source 46 so that it receives light only each time a slot 44 is positioned in the path of light from source 46. Electric current pulses produced by the photocell 48 pursuant to successive illuminations thereof as disc 40 rotates, are passed to an amplifier 54 and thence to a monostable multi-vibrator 56. Amplifier 54 and multi-vibrator 56 are powered from line 50 and rail 52.

Multi-vibrator 56 is triggered off the trailing edges amplified pulses from photocell 48 and produces a pulse train on an output line 58 therefrom. Pulses of this pulse train are of constant amplitude and are of the same freguency as pulses fed to the multi-vibrator but have constant pulse width. These pulses are passed to a three stage RC filter 60 which comprises three series connected resistors 62 and three capacitors 64 each coupled to rail 52 and respectively to the successive resistors 62 at sides of the resistors remote from multi-vibrator 56. Output from filter 60, as measured between rail 52 and line 66 from filter 60, comprises a smoothed analogue signal voltage, the amplitude of which is directly proportional to the frequency of signal applied on line 58 and thus also directly proportional to the speed of rotation of disc 40.

Figure 3:
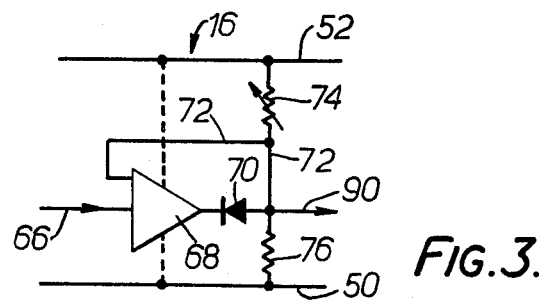
FIG. 3 is a diagram of the electrical circuit of a DC voltage selector incorporated into the taxi meter of FIG. 1.

DC voltage selector 16 (FIG. 3) comprises an operational amplifier 68 one input of which is coupled to line 66 to receive signal from generator 12. The output side of the amplifier is coupled to one side of a diode 70, the other side of the diode being connected via a line 72 in a feed-back loop to the other input of amplifier 68. Line 72 is coupled to an output line 90, to positive supply rail 52 via a variable resistor 74 and to ground line 50 via a resistor 76. The operation of DC selector 62 is such that in the event that the voltage between rail 52 and line 66 is less than that which line 72 would assume if this voltage were to be determined only as the proportion of the supply voltage between rail 52 and line 50 as established by the division ratio of resistors 74 and 76, then line 90 will assume the latter voltage. On the other hand, if voltage between rail 52 and line 66 exceeds such voltage, then lines 72 and 90 will assume the voltage of line 66. Thus, the operation is such that when the taxi is stationary, and disc 40 is also consequently stationary, line 90 will assume the fixed proportion of the supply determined by the ratio of resistors 74 and 76 and will remain at this voltage, as the taxi accelerates from rest, until a stage is reached at which the voltage between rail 52 and line 66 is greater, whereupon voltage of line 90 will be proportional to speed of the taxi. It is in this way that the transition from computing of fares at a time rate to computing them at a distance travelled rate is accomplished.

It is possible to so adjust resistor 74 that immediately any substantial voltage is present on line 66 pursuant to the taxi beginning to move from rest, the voltage on line 90 will follow that on line 76. This mode of operation is sometimes desirable to give a distance only fare computation with no time rate fare charge.

Figure 4:
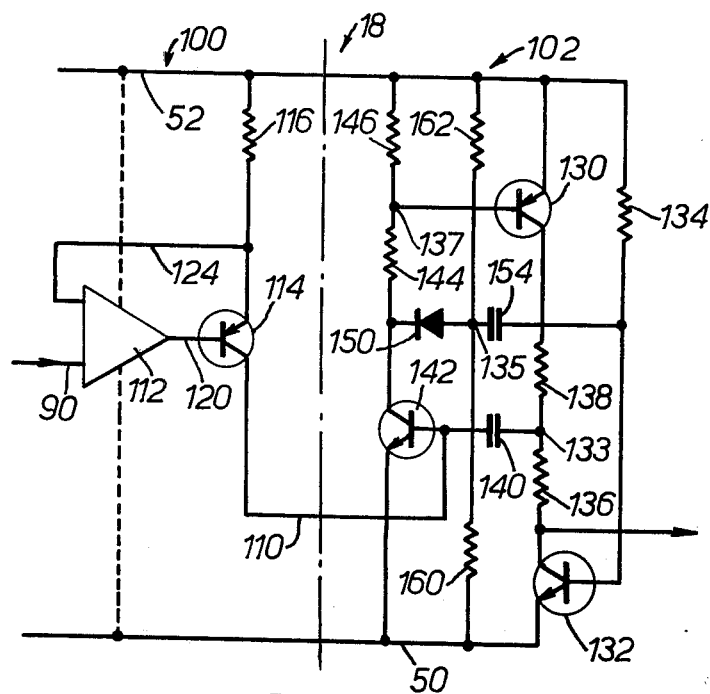
FIG. 4 is a diagram of the electrical circuit of a voltage controlled oscillator incorporated into the taxi meter of FIG. 1.

Referring now to FIG. 4, the voltage-controlled oscillator 18 comprises a precision current source 100 which operates to provide a current on an output line 110 therefrom which is directly proportional to the voltage on line 90 from voltage selector 16. Source 100 includes an operational amplifier 112, one input of which is coupled to line 90 and a transistor 114. Transistor 114 has its emitter connected to supply rail 52 via a resistor 116 and its collector connected to line 110. The base is connected via a line 120 to the output from amplifier 112 and the emitter of the transistor is coupled in a feed-back line 124 to the second input of amplifier 112. The interconnection of the amplifier 112 and transistor 114 is such that current flow from line 52 through transistor 114 to line 110 is regulateed so as to be proportional to the magnitude of the voltage difference between rail 52 and line 90.

Line 110 is coupled to an astable multi-vibrator 102 which forms a second part of voltage controlled oscillator 18. This includes a transistor 132 having its emitter connected to ground line 50, its base connected to positive supply rail 52 via a resistor 134 and having its collector connected to a resistor 136. A second transistor 130 has its emitter coupled to rail 52 and its collector connected to a resistor 138. Resistors 138 and 136 are connected, at ends remote from the collectors of the respective transistors 130 and 132, at a junction 133. Junction 133 is connected to one side of a capacitor 140. The other side of the capacitor is connected both to line 110 from current source 100 and to the base of a third transistor 142. Transistor 142 has its emitter connected to ground line 50 and its collector connected to one side of a resistor 144, the other side of resistor 144 being coupled to rail 52 via a resistor 146. A diode 150 is connected from the collector of transistor 142 to one side of a capacitor 154, the other side of capacitor 154 being connected to the base of transistor 132. The junction 135 between diode 150 and capacitor 154 is coupled to ground line 50 via resistor 160 and to rail 52 via a resistor 162. The base of transistor 130 is coupled to the junction 137 between resistors 144 and 146.

The operation of multi-vibrator 102 will be described as beginning from a state in which transistors 130 and 142 are both off and transistor 132 is on. It is assumed, firstly, that capacitor 140 has just been charged to a voltage approaching the voltage between line 50 and rail 52, with the side thereof coupled to junction 133 being substantially at ground potential, owing to transistor 132 being on, and with the other side thereof being below ground potential. In this condition, capacitor 140 will receive current from line 110 and will charge at a rate proportional to current flow therefrom. After a time which will be proportional to the rate of current flow on line 110, capacitor 140 will be charged such that the voltage at the side thereof connected to the base of transistor 142 will be sufficient to turn transistor 142 on, since the collector of this transistor is coupled directly to the positive supply via resistors 144 and 146 and the emitter is coupled to ground at line 50. Prior to this turning on of transistor 142, transistor 130 is held in the off condition by virtue of there being no voltage applied to the base thereof, however, when transistor 142 is turned on, the end of resistor 144 which is coupled to the collector of transistor 142 assumes substantially ground potential and resistors 144 and 146 thus act as a voltage divider across line 50 and rail 52 so that junction 137 and the base of transistor 130 assume a voltage which turns transistor 130 on.

Resistor 160 is substantially greater than resistor 162 and the side of capacitor 154 which is coupled to the junction 135 of these therefore assumes, prior to turning on of transistor 142 when no current flow through the diode 150 occurs, a substantial positive voltage which is arranged to be somewhat greater than the potential of the other side of capacitor 154 which is coupled to the base of transistor 132. Capacitor 152 thus assumes a charged state. When transistor 142 is turned on, the junction between diode 150 and capacitor 154 is immediately placed at substantially ground potential because current flow from rail 52, through resistor 162 the diode and transistor 142 to ground can occur and the charge voltage of the capacitor is applied to the base of transistor 132 thus causing the base to assume a voltage which is well below ground potential thereby turning off transistor 132. The charge on capacitor 154 is dissipated relatively quickly, the capacitor then charging in the reverse polarity from supply rail 52. As this charging occurs, the voltage of the base of transistor 132 rises until it is sufficient to again turn on transistor 132. The time interval for which transistor 132 is on is arranged to be a very small period, of the order of 1 millisecond.

In the period when transistor 132 is turned off, capacitor 140 can charge from rail 52 via transistor 130 and resistor 138. It will thus assume a charge voltage approaching the supply voltage, the side of the capacitor being coupled to junction 135 reaching approximately the supply voltage and the side coupled to the base of transistor 142 being substantially at ground potential. The time constant of the charging circuit for the capacitor is arranged such that the capacitor can reach a steady fully charged voltage within the short period in which transistor 132 is off.

When transistor 132 is turned on pursuant to charging of capacitor 154, the side of capacitor 140 which is connected to the collector of transistor 132 via resistor 136 is effectively placed at a voltage close to earth potential so that the charge voltage of capacitor 140 is effectively applied across the emitter base junction of transistor 142 to cause the base to assume a negative voltage relative to the emitter thereby to turn off transistor 142. As soon as transistor 142 is turned off, transistor 130 is likewise turned off and the circuit is readied for another cycle.

Output from multi-vibrator 102 is taken from the collector of transistor 132. This output comprises a series of output pulses, produced at each interval when transistor 132 is off. These pulses are of short duration and are separated by periods directly proportional to the applied voltage between line 90 and rail 52. By this means it is assured that the oscillator possesses linear input voltage frequency characteristics.

The counter 21 and display 22 may be of a type known well in the art employing, for example, decade counters which drive conventional numeral display devices. The rate of fare advancement may be varied by appropriate selection, in the counter, of the number of pulses which need to be received from oscillator 18 before advancement of the indicated fare is effected by one unit.

Figure 5:
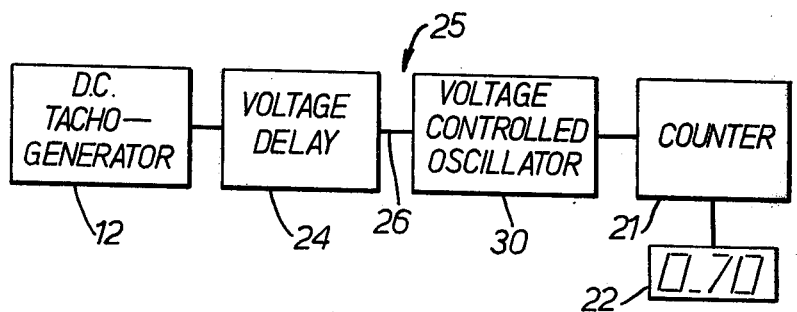
FIG. 5 shows a modification to the taxi meter of FIG. 1.

In the taxi meter 25 of FIG. 5, the output from tachometer 12 is fed, instead of to selector 16, to a voltage delay device 24 which operates to delay the output from the tacho generator. This delayed output, on line 26, is passed to an oscillator 30 of the kind having an output frequency which is fixed when there is no voltage on line 26, but which is proportional to the output voltage on line 26 when such voltage is present. Output from the voltage controlled oscillator is passed to counter 21 and display 22. The arrangement of FIG. 5 operates in an analogous way to the embodiment of FIG. 1, except that as output from tacho generator 12 rises upon acceleration of the taxi from rest, the rise in voltage is delayed so that the switching of the oscillator to the condition where its output is dependent upon the tacho generator output is delayed to correspond to occurrence of a predetermined taxi speed.

Voltage delay 24 may comprise a simple RC circuit such as that provided by the filter 60 of FIG. 2. The RC circuit should have a relatively long time constant sufficient to delay rise in voltage on line 26 by a short time interval. Oscillator 30 may be of the same form as oscillator 18 except for modification of current source 100 in a manner known per se to provide a constant current flow on line 110 when there is no signal on line 90 thereto and to provide a proportionally rising output current on line 110 when voltage on line 90 increases. Alternatively, it could, of course, merely comprise the oscillator 18 together with the source 14 and voltage selector 16 described.

In both described embodiments, the tacho generator 12 may be electronic or electromechanical but in any event preferably has an output which is a direct current voltage proportional to angular velocity of an input shaft thereof.

Because the oscillators 18 or 30 operate continuously, there is no loss of pulses when switching between the two operative conditions thereof is effected. Whilst the described arrangement utilises a direct current analogue voltage to represent the speed of the taxi this speed could be represented, for example, by a direct current.

The described construction has been advanced merely by way of explanation and many modification may be made thereto without departing from the spirit and scope of the invention as defined in the appended claims.

The claims defining the invention are as follows:

1. A taximeter comprising:
generator means for generating a generator analog signal representing the speed of a taxi with which the meter is to be used;
a reference source for generating a reference analog signal representative of a predetermined speed of said vehicle;
selector means coupled to receive and compare the analog signals generated by said generator means and by said source; and
fare read-out means coupled to said selector means for displaying a fare charged which is advanced in dependence upon the reference analog signal when the generator analog signal is indicative of a lesser speed than said predetermined speed and in dependence upon the generator analog signal when the speed represented thereby is greater than said predetermined speed.

2. A taximeter is claimed in claim 1 including an oscillator coupled to receive the selected one of said analog signals from said selector means and operable to generate an output signal having a frequency which is fixed when said reference analog signal is passed thereto and which is at a frequency proportional to the speed indicated by the generator analog signal when the generator analog signal is passed thereto; and
wherein the fare read-out means includes counter and display means coupled to receive said output signal and operating to count individual pulses thereof and to display visually said fare charge in accordance with pulses so counted.

3. A taximeter is claimed in claim 2 wherein:
said generator means generates said generator analog signal as a unidirectional electrical signal the magnitude of which is directly proportional to the speed of the vehicle;
said reference analog signal is generated by said source as a uni-directional electrical signal of constant magnitude;
said selector means is operative to pass whichever of these electrical signals is the greater to said oscillator; and
said oscillator is of the kind in which the frequency of generation of output signals therefrom is directly dependent upon the magnitude of the electrical signal applied thereto.

4. A taximeter as claimed in claim 3 wherein:
said analog signals are generated in the form of DC voltages; and
said oscillator is a voltage controlled oscillator.

* * * * *